Patented Sept. 28, 1948

2,450,400

UNITED STATES PATENT OFFICE 2,450,400

PROCESS FOR PRODUCING DYE INTERMEDIATES

Thomas Robert Thompson, Binghamton, N. Y., assignor to General Aniline & Film Corporation, New York, N. Y., a corporation of Delaware No Drawing. Application January 26, 1944, Serial No. 519,811

17 Claims. (Cl. 260—298)

This invention relates to a method for the preparation of intermediates useful in the production of carbo- and merocyanine dyes.

In general, the invention relates to a method of producing thioketones having the general formula

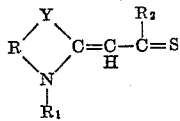

and the alkylated derivatives thereof which may be represented by the formula

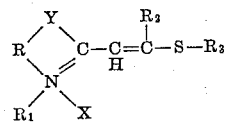

In the above formulae, Y stands for sulfur or selenium.

R stands for vinylene, phenylene and naphthylene.

$R_1$ and $R_2$ stand for alkyl, aralkyl or aryl.

$R_3$ stands for alkyl, and

X stands for an acid radical such as Cl, Br, I, $ClO_4$, $NO_3$, $SO_4.CH_3$, $SO_4.C_2H_5$,

and SCN, or any other acid radical forming an alky or alkaryl ester.

To prepare carbocyanine dyes it is necessary first to produce from nitrogenous heterocyclic nuclei or cycloammonium salts, intermediates which can then be condensed with another nitrogenous heterocyclic nuclei or cycloammonium salt to form the dye. For example, in U. S. Patent 2,107,379, the production of intermediates suitable for this purpose is disclosed which involves treating a cycloammonium salt with an arylthioimide or iminothioether to prepare a $\beta$-alkyl-$\beta$-anilinovinyl or $\beta$-alkyl-$\beta$-alkylmercaptovinyl derivative. The latter is then condensed with another heterocyclic base to form the carbocyanine dye.

The alkyl mercapto compounds react readily with the active methyl group of quaternary salts of nitrogenous heterocyclic bases. The alky mercapto compounds have the advantages of leading to asymmetrical meso-substituted carbocyanine which can be more easily purified and can be obtained in better yields.

However, the prior process of producing the intermediates possesses certain disadvantages in that the aryl thioimides or the iminothioethers as well as the intermediate products resulting therefrom are relatively difficult to obtain, and the yields are not satisfactory.

I have found that intermediate products suitable for the production of the carbocyanine and merocyanine dyes can be prepared more cheaply and readily and in a direct manner with satisfactory yields by reacting alkyl or aryl thio acids, or their salts, with quaternary salts of a substituted or unsubstituted 2-methyl-thiazole or selenazole. The process results in the production of thioketones and their alkylation products of the type represented by the above formulas.

The thio acids or their salts react with the quaternary salt on heating in the presence of a suitable solvent. For example, thiopropionic acid reacts with the quaternary salts when heated to approximately 120° C. in a solvent, such as pyridine, for several hours. The thioketone compound is precipitated with small amounts of water and extracted with benzene, and can be isolated from the benzene solution or it can be treated with an alkylating agent, such as methyl or ethyl p-toluenesulfonate or an alkyl halide such as methyl and ethyl iodide or the corresponding bromides and chlorides, dimethyl and diethyl sulfate, the ethyl perchlorate, ethyl thiocyanate, $\beta$-hydroxyethyl iodide, and ethyl nitrate.

The resulting mercapto compounds may be crystallized from the benzene solution and may be further recrystallized. The compounds are easily purified by recrystallization from either methanol or a mixture of methanol and water. Charcoal may also be used to advantage in the purification. The mercapto compounds thus obtained can be condensed with the quaternary salts of nitrogenous heterocyclic bases or cycloammonium salts having an active methyl or methylene group. The condensation may be effected in the presence of pyridine or such alcoholic solvents as isopropanol and n-propanol and basic condensing agents. As a condensing agent, there may be used pyridine, triethylamine, trimethylamine, piperidine, triethanolamine, n-butylamine and diethylamine. The use of heat facilitates the condensation reaction.

Numerous quaternary salts of the 2-methyl-thiazole and selenazole may be used as starting material in my process. As examples may be mentioned the quaternary salts of 2.4-dimethylthiazole, 2.4 - dimethylselenazole, 2 - methyl - 4 - phenylthiazole and 2-methyl-4-phenylselenazole. As examples of 2-methylbenzothiazoles and benzoselenazoles are mentioned 2-methylbenzoselenazole, 2-methylbenzothiazole, 2.6- and 2.5-dimethylbenzoselenazole, 2 - methyl - 6-methylbenzoselenazole, 6 - methoxy - 2-methylbenzoselenazole, 2-methyl-β-naphthiazole, 2-methyl-6-aminobenzothiazole, 2-methyl-5-aminobenzothiazole, 2.6-dimethyl-5-amino-benzothiazole and numerous others which fall under this class of compounds. In general, the substituents in the aryl ring may be alkyls, such as $CH_3$, $C_2H_5$ and $C_3H_7$; aryls and aralkyls such as $C_6H_5$ and $C_6H_5CH_2$—; alkoxy, such as O—$CH_3$ and O—$C_2H_5$; halogens, such as Cl, Br and I; amino and substituted amino groups such as acetylamino.

As examples of the thio acids and their salts which may be utilized are mentioned thiopropionic acid, sodium thioacetate, sodium thiopropionate, lead thiopropionate, sodium thiobenzoate and the corresponding potassium salts as well as the alkali earth metal salts. In addition to the above mentioned acids, there may also be used thiobutyric acid, thiovaleric acid, phenylthioacetic acid, and in general, acids of the akyl or aryl type and their alkali metal or alkali earth metal salts. Methods of preparing the various thio acids are already described in the literature.

As examples of suitable solvents, there may be mentioned pyridine, acetanilide, methyl alcohol, ethyl alcohol, n-propanol, benzene and other alcohols and solvents of the neutral, basic or acid-binding type. In general, a neutral or inert solvent is utilized when the salt of the thio acid is used, and the acid-binding or basic solvent when the free thio acid is used. The temperature at which the reaction is carried out may vary but in general falls within the range of approximately 100° to 160° C. As shown in the examples which follow, the reactants may be mixed at room temperature and the only heating necessary is that afforded by the evaporation procedure.

The following examples illustrate the invention:

*Example 1.—5-methyl-2-(β-ethyl-β-methylmercaptovinyl)-benzoselenazole ethiodide*

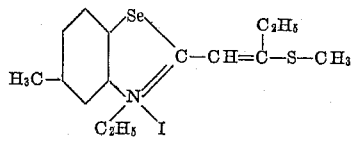

Two grams (0.005 mole) of 2,5-dimethylbenzoselenazole ethyl p-toluenesulfonate, 1.5 g. (0.017 mole) of thiopropionic acid, and 15 cc. of pyridine were refluxed for two and one half hours, the pyridine was then evaporated on the steam bath with the aid of a current of air, and the residue treated with 50 cc. of water. The oily suspension was extracted with benzene. The thioketone was obtained by evaporation of the dry benzene solution. Its formula may be represented by

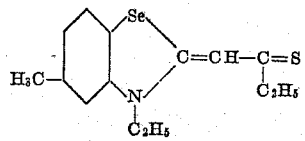

On addition of 1 cc. of methyl iodide and stirring at room temperature, a yellow solid formed which was filtered and washed with a mixture of acetone-ether (50:50). The yield was 0.8 g. or 35.3%.

*Example 2.—6-methyl-2-(β-ethyl-β-methylmercaptovinyl)-benzothiazole ethiodide*

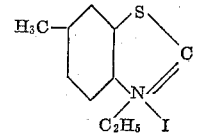

A mixture of 3.6 g. (0.01 mole) of 2,6-dimethylbenzothiazole ethyl p-toluenesulfonate, 1.8 g. (0.02 mole) of thiopropionic acid, and 15 cc. of pyridine were refluxed for two and one-half hours. The pyridine was evaporated and the residue shaken with 50 cc. of water and 40 cc. of benzene. The benzene layer was dried over sodium sulfate and 1.6 g. (0.01 mole+10% excess) of methyl iodide added. After standing several hours a yield of 1.4 g. of yellow crystals was obtained.

*Example 3. — 5-methoxy-2-(β-ethyl-β-methylmercaptovinyl)-benzoselenazole ethiodide*

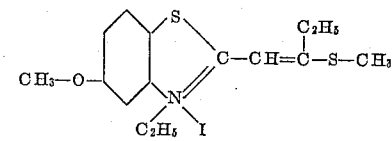

A mixture of 4.26 g. (0.01 mole) of 5-methoxy-2-methyl-benzoselenazole ethyl p-toluene-sulfonate, 2.7 g. of thiopropionic acid, and 15 cc. of pyridine were refluxed for one hour. The pyridine was evaporated from the reaction mixture and the resulting residue treated with water and extracted with benzene. The benzene layer was separated, dried, and 1.5 cc. methyl iodide added. On standing, yellow crystals formed. The yield was 1.2 g. or 26%.

*Example 4. — 2-(β-methyl-β-methylmercaptovinyl)-benzothiazole ethiodide*

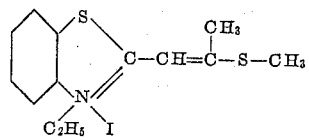

A solution of 3.49 g. (0.01 mole) of 2-methylbenzothiazole ethyl p-toluenesulfonate in methyl alcohol (15 cc.) was mixed with a solution of 1 g. (0.01 mole) of sodium thioacetate. After standing 15 minutes, the alcohol was evaporated on the steam bath and the residue extracted with benzene. On addition of 1 cc. of methyl iodide to the dry benzene solution and standing, a yield of 0.7 g. of yellow crystals was obtained.

*Example 5.—2-(β-phenyl-β-methylmercaptovinyl)-benzothiazole ethiodide*

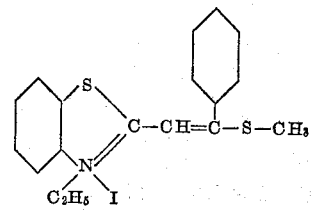

A solution of 3.49 g. (0.01 mole) of 2-methyl-benzothiazole ethyl p-toluenesulfonate in 10 cc. of n-propanol was added to a well stirred suspension of 1.6 g. (0.01 mole) of sodium thiobenzoate in 50 cc. of hot n-propanol. The mixture was stirred on the steam bath for 15 minutes, cooled and the sodium p-toluenesulfonate formed during the reaction removed by filtration. The filtrate was evaporated and the residue dissolved in benzene. After addition of 1 cc. of methyl iodide to the benzene solution and standing, a yield of 0.25 g. of yellow crystals was obtained.

*Example 6.—2-(β-ethyl-β-methylmercaptovinyl)-benzothiazole ethiodide*

A mixture of 4.8 g. (0.02 mole) of 2-methylbenzothiazole ethosulfate and 2.4 g. (0.02 mole) of sodium thiopropionate was suspended in 50 cc. of benzene and refluxed two hours. The benzene was decanted and on cooling 2 cc. of methyl iodide added. A total of 1.7 g. of yellow crystals was obtained.

*Example 7.—2-(β-ethyl-β-methylmercaptovinyl)-benzothiazole ethiodide*

A mixture of 3.5 g. (0.01 mole) of 2-methylbenzothiazole ethosulfate, 1.2 g. (0.01 mole) of sodium thiopropionate, and 7.5 g. of acetanilide was heated in an oil bath at 160° C. for two hours. On cooling, 50 cc. of benzene were added, the mixture warmed and filtered. On adding 2 cc. of methyl iodide to the benzene solution and standing, a 0.6 g. yield was obtained.

*Example 8.—2-(β-methyl-β-methylmercaptovinyl)-β-naphthiazole ethiodide*

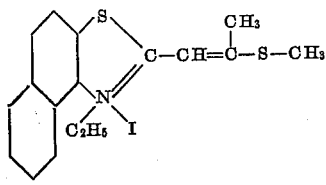

A mixture of 2.0 g. of 2-methyl-β-naphthiazole ethyl p-toluenesulfonate and 50 cc. of n-propanol was added to a solution of 1 g. sodium thiopropionate in 20 cc. of n-propanol. After standing for ten minutes, the precipitated sodium p-toluenesulfonate was removed by filtration and the filtrate evaporated to a very small volume. The residue was dissolved in the smallest amount of hot benzene and on cooling 1 cc. of methyl iodide was added. After standing several hours, the crystals are collected and washed with a 50:50 acetone-ether solution. The yield of olive green crystals was 30% of the theoretical.

The mercaptovinyl intermediates described above may be used in producing photographic sensitizing dyes as already stated. In preparing mercocyanine dyes, they are condensed with a heterocyclic compound containing a nuclear methylene group adjacent to a nuclear carbonyl or thiocarbonyl group. Examples of such compounds are rhodanine, and its alkyl and aryl derivatives such as allyl-, methyl-, ethyl- and ethylphenyl-rhodanine; thiohydantoin, 2:4-diketotetrahydrothiazole, 2-thio-oxazoledione-4, 2-thioselenazoledione-4, oxindole, thioindoxyl, α-hydrindone, β-hydrindone, thionaphthenone and their alkyl and aryl substituents.

I claim:

1. The process which comprises reacting a quaternary ammonium salt in which the heterocyclic nitrogenous ring contains only 5 atoms and having the formula

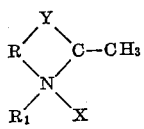

with a compound selected from the group consisting of thio acids having the grouping

and salts of said acids, where Y in the above formula is selected from the group consisting of sulfur and selenium, R is selected from the group consisting of vinylene, phenylene and naphthylene, $R_1$ is selected from the group consisting of alkyl, aryl and aralkyl, and X is an acid radical.

2. The process as in claim 1 wherein the reaction is carried out in the presence of a solvent.
3. The process as in claim 1, wherein the salt of the thio acid is an alkali metal salt.
4. The process as in claim 1 wherein the thio acid is thiopropionic acid.
5. The process as in claim 1 wherein the thio acid salt is sodium thioacetate.
6. The process as in claim 1 wherein the thio acid salt is sodium thiobenzoate.
7. The process as in claim 1 wherein the reaction product formed is alkylated with an alkylating agent.
8. The process as in claim 1 wherein the reaction product formed is alkylated by treating it with ethyl p-toluene-sulfonate.
9. The process as in claim 1, wherein the reaction product is alkylated by treating it with methyl iodide.
10. The process for preparing intermediates for methine dyes which comprises reacting 2,5-dimethyl-benzoselenazole ethyl p-toluenesulfonate with thiopropionic acid.
11. The process as in claim 10 in which the reaction is carried out in the presence of an acid-binding solvent.
12. The process as in claim 10 in which the reaction is carried out in the presence of pyridine.
13. The process as in claim 10 in which the reaction product formed is alkylated with methyl iodide.
14. The process for preparing intermediates for methine dyes which comprises reacting 2,6-dimethylbenzothiazole ethyl p-toluenesulfonate with thiopropionic acid.
15. The process as in claim 14 wherein the reaction product is alkylated with methyl iodide.
16. The process for preparing intermediates for methine dyes which comprises reacting 5-methoxy-2-methylbenzoselenazole ethyl p-toluenesulfonate with thiopropionic acid.
17. The process as in claim 16 in which the reaction product is treated with methyl iodide.

THOMAS ROBERT THOMPSON.

REFERENCES CITED

The following references are of record in the file of this patent:

UNITED STATES PATENTS

| Number | Name | Date |
|---|---|---|
| 2,293,237 | Bartlett | Aug. 18, 1942 |
| 2,315,498 | Brookker | Apr. 6, 1946 |
| 2,349,179 | Kumetat | July 25, 1944 |
| 2,354,524 | Kumetat | July 25, 1944 |

FOREIGN PATENTS

| Number | Country | Date |
|---|---|---|
| 549,204 | Great Britain | Nov. 11, 1942 |

Certificate of Correction

Patent No. 2,450,400.  September 28, 1948.

THOMAS ROBERT THOMPSON

It is hereby certified that errors appear in the printed specification of the above numbered patent requiring correction as follows:

Column 1, line 47, for "alky" read *alkyl*; column 4, lines 9 to 14 inclusive, Example 2, for 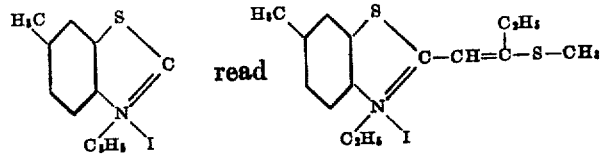

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*